United States Patent
Cahill et al.

(10) Patent No.: US 10,259,569 B2
(45) Date of Patent: Apr. 16, 2019

(54) SYSTEMS AND METHODS FOR EMERGENCY AIRCRAFT BRAKE OPERATION

(71) Applicant: Goodrich Corporation, Charlotte, NC (US)

(72) Inventors: Eric Cahill, Troy, OH (US); Efrem E. Ayichew, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/295,687

(22) Filed: Oct. 17, 2016

(65) Prior Publication Data

US 2018/0105259 A1 Apr. 19, 2018

(51) Int. Cl.
*B64C 25/42* (2006.01)
*B64D 45/00* (2006.01)
*B60T 8/17* (2006.01)
*B60T 8/88* (2006.01)

(52) U.S. Cl.
CPC ............ *B64C 25/42* (2013.01); *B60T 8/1703* (2013.01); *B60T 8/885* (2013.01); *B64D 45/00* (2013.01); *B60T 2220/04* (2013.01); *B60T 2270/402* (2013.01); *B60T 2270/413* (2013.01)

(58) Field of Classification Search
CPC .................................................... B64C 25/42
See application file for complete search history.

(56) References Cited

U.S. PATENT DOCUMENTS

| | | | |
|---|---|---|---|
| 5,962,777 A | 10/1999 | Salamat | |
| 6,361,124 B1 * | 3/2002 | Marra | B60T 13/662 303/15 |
| 6,820,946 B2 * | 11/2004 | Salamat | B60T 8/1703 303/122.09 |
| 7,281,684 B2 * | 10/2007 | Steiner | B60T 8/1703 188/71.1 |

(Continued)

FOREIGN PATENT DOCUMENTS

| | | |
|---|---|---|
| GB | 2458378 | 9/2009 |
| GB | 2469892 | 11/2010 |
| WO | 0069721 | 11/2000 |

OTHER PUBLICATIONS

European Patent Office, European Search Report dated Feb. 26, 2018 in Application No. 17196635.1-1012.

*Primary Examiner* — Alex C Dunn
(74) *Attorney, Agent, or Firm* — Snell & Wilmer, L.L.P.

(57) ABSTRACT

A brake system for an aircraft is provided according to various embodiments. The system may include a left pedal arrangement comprising a left pedal, a first left sensor to generate a first left signal in response to translation of the left pedal. The system also includes a right pedal arrangement comprising a right pedal, a first right sensor to generate a first right signal in response to translation of the right pedal. Normal brake control logic controls the brake system in response to a normal condition being set. The normal brake control logic commands a left brake based on the left signal, and a right brake based on the first right signal. Emergency brake control logic controls the brake system in response to an emergency condition being set. The emergency brake control logic commands a same force to the left and right brakes based the left and right signals.

19 Claims, 5 Drawing Sheets

(56) References Cited

U.S. PATENT DOCUMENTS

| | | | | |
|---|---|---|---|---|
| 7,367,633 B2* | 5/2008 | Craig | B60T 13/588 | 180/370 |
| 7,401,869 B2* | 7/2008 | Mallevais | B60T 8/1703 | 303/122.04 |
| 7,618,100 B2* | 11/2009 | Griffith | B60T 8/1703 | 303/126 |
| 8,204,661 B2* | 6/2012 | Godo | B60T 13/74 | 701/3 |
| 8,332,114 B2* | 12/2012 | Whittingham | B60T 8/1703 | 244/111 |
| 8,948,994 B2 | 2/2015 | Frank | | |
| 9,039,102 B2* | 5/2015 | Cahill | B64C 25/426 | 303/113.4 |
| 9,604,720 B2* | 3/2017 | Cahill | B64C 25/48 | |
| 2004/0239173 A1* | 12/2004 | Williams | B60T 8/1703 | 303/3 |
| 2009/0228174 A1* | 9/2009 | Takagi | B60T 8/17558 | 701/41 |
| 2009/0240412 A1* | 9/2009 | Cahill | B60T 8/885 | 701/70 |
| 2010/0038188 A1* | 2/2010 | Cahill | B60T 17/221 | 188/1.11 E |
| 2010/0274458 A1* | 10/2010 | Cahill | B60T 8/1703 | 701/76 |
| 2010/0276988 A1* | 11/2010 | Cahill | B60T 8/1703 | 303/20 |
| 2011/0040466 A1* | 2/2011 | Hill | B60T 8/1703 | 701/74 |
| 2011/0226569 A1 | 9/2011 | Devlieg | | |
| 2012/0261980 A1* | 10/2012 | Hurst | B60T 8/1703 | 303/9.75 |
| 2015/0088371 A1* | 3/2015 | Kanemori | B60T 8/1703 | 701/33.9 |
| 2016/0059956 A1 | 3/2016 | Cahill | | |
| 2018/0105259 A1* | 4/2018 | Cahill | B64D 45/00 | |

* cited by examiner

SYSTEMS AND METHODS FOR EMERGENCY AIRCRAFT BRAKE OPERATION

FIELD

The disclosure relates generally to systems and methods for controlling braking force in emergency conditions.

BACKGROUND

Aircraft typically have brakes on the wheels to slow the aircraft during rejected takeoffs, landing, and taxiing. Brakes often rely on pedals having sensors to determine how far a pedal is deflected from a resting position. However, one or more sensors on a pedal may give transient readings or fail occasionally. Such a failure may compromise brake control by the pilot or copilot of an aircraft. For example, pilots and copilots may use "differential braking" to steer an aircraft using left brakes to turn left and right brakes to turn right. However, in the event of a sensor failure, differential braking may not be available.

SUMMARY

A brake system for an aircraft is provided according to various embodiments. The system may include a left pedal arrangement comprising a left pedal, a first left sensor configured to generate a first left signal in response to translation of the left pedal. The system also includes a right pedal arrangement comprising a right pedal, a first right sensor configured to generate a first right signal in response to translation of the right pedal. Normal brake control logic may be configured to control the brake system in response to a normal condition being set. The normal brake control logic commands a first left force to a left brake of the aircraft based on the first left signal, and a first right force to a right brake of the aircraft based on the first right signal. Emergency brake control logic may be configured to control the brake system in response to an emergency condition being set. The emergency brake control logic may command a same force to the left brake and the right brake based the left and right signals.

In various embodiments, the system may include a second left sensor configured to generate a second left signal in response to translation of the left pedal, or a second right sensor configured to generate a second right signal in response to translation of the right pedal. The system may also include a third left sensor configured to generate a third left signal in response to translation of the left pedal, or a third right sensor configured to generate a third right signal in response translation of the right pedal. A sensor signal processing logic may determine the first signal, the second signal, and the third signal are valid and generates an output signal for the corresponding pedal. The sensor signal processing logic may also determine the first right signal, the second right signal, and the third right signal are valid by comparing the first right signal, the second right signal, and the third right signal to determine whether a difference between the signals is within a predetermined threshold.

In various embodiments, the sensor signal processing logic may also generate the output signal for the left pedal by averaging the first signal, the second signal, and the fourth signal. The normal brake control logic may generate an excitation signal for the first left sensor and the first right sensor from a microprocessor. The emergency brake control logic may provide an analog excitation signal to the first sensor and the second sensor in response to the emergency condition being set. The emergency brake control logic may send a signal to the normal brake control logic to shut off in response to the emergency condition being set. The emergency brake control logic may also command a same force to the left brake and the right brake based on a greatest value from the first left signal from the left pedal, the first right signal from the right pedal, a second left signal from a copilot left pedal, and a second right signal from a copilot right pedal. The emergency brake control logic may include a latch configured to maintain the emergency condition in response to the emergency condition being set. A switch may be operable to set the emergency condition.

A method of controlling a brake system in an aircraft is also provided. The method includes setting an emergency condition in the brake system comprising a left brake and a right brake. A left pedal may be configured to control the left brake and a right pedal may be configured to control the right brake under normal operation. A first signal is received from a first sensor on the left pedal, a second signal from a second sensor on the left pedal, and a third signal from a third sensor on the left pedal. The method further includes comparing the first signal, the second signal, and the third signal to determine the first signal, the second signal, and the third signal are valid, and generating an output value for the left pedal based on the first signal, the second signal, and the third signal. A same brake force may be commanded at the left brake and the right brake based on the output value for the left pedal.

In various embodiments, the method includes receiving a fourth signal from a fourth sensor on the right pedal, a fifth signal from a fifth sensor, and a sixth signal from a sixth sensor on the right pedal. The fourth signal, the fifth signal, and the sixth signal may be compared to determine at least one of the fourth signal, the fifth signal, or the sixth signal is invalid. The fourth signal, the fifth signal, and the sixth signal may be found invalid in response to a difference between the fourth signal and the fifth signal being greater than a predetermined value. The output value for the left pedal may be selected in response to the output value for the left pedal being greater than the output value for a second pedal.

A brake control unit is also provided and includes a processor, and a tangible, non-transitory memory configured to communicate with the processor, the tangible, non-transitory memory having instructions stored thereon that, in response to execution by the processor, cause the brake control unit to perform operations. The operations may include setting an emergency condition to switch control of an aircraft brake from a normal brake control logic to an emergency brake control logic, comparing a first value from a first pedal, a second value from a second pedal, and a third value from a third pedal, selecting a selected value from the first value, the second value, and the third value, and commanding a same brake force at a left brake and a right brake based on the selected value.

In various embodiments, the selected value may be selected by taking a greatest value from the first value, the second value, and the third value. The BCU may be configured to receive a first signal from a first sensor, a second signal from a second sensor, and a third signal from a third sensor on the fourth pedal. The BCU may compare the first signal, the second signal, and the third signal to determine at least one of the first signal, the second signal, or the third signal is invalid. The BCU may determine the first signal, the second signal, and the third signal are invalid in response to a difference between at least two of the first signal, the second signal, and the third signal being greater than a predetermined value.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
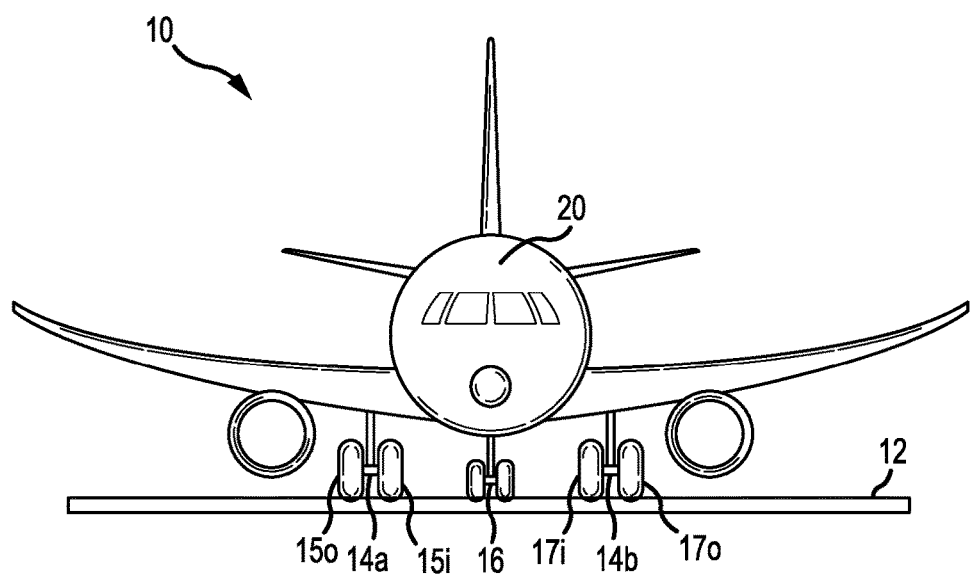
FIG. 1 illustrates an exemplary aircraft with landing gear deployed, in accordance with various embodiments.

With reference to FIG. 1, an aircraft 10 on a runway 12 is shown in accordance with various embodiments. Aircraft 10 may comprise right landing gear 14a and left landing gear 14b. Nose landing gear 16 is located under the nose of aircraft 10 and may not include a brake. Each landing gear is illustrated in FIG. 1 as having two wheels. For example, right landing gear 14a may comprise a plurality of wheels, such as a right outboard (ROB) wheel 15o and a right inboard (RIB) wheel 15i. Left landing gear 14b may comprise a plurality of wheels, such as a left outboard (LOB) wheel 17o and a left inboard (LIB) wheel 17i. In various embodiments, aircraft 10 may comprise any number of landing gears and each landing gear may comprise any number of wheels.

Figure 2:
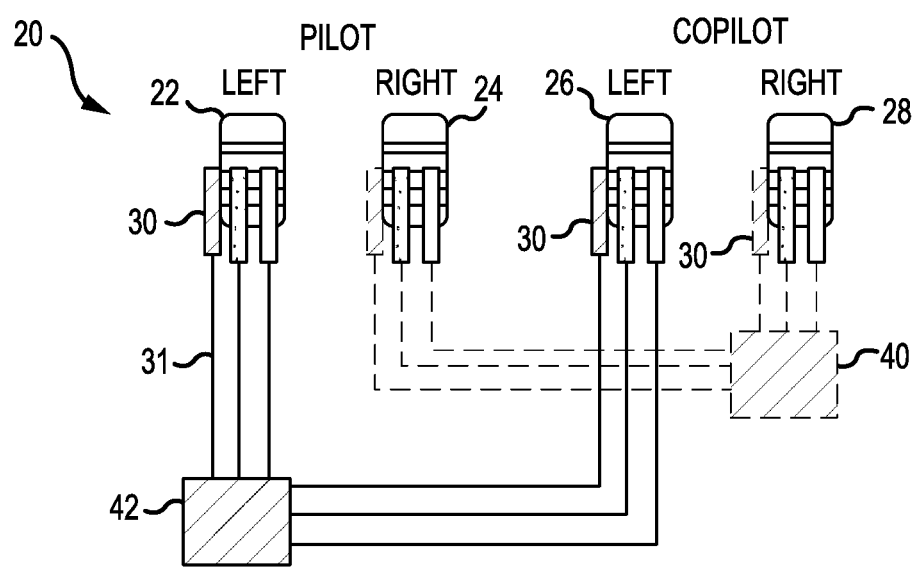
FIG. 2 illustrates a pedal controlled brake system having multiple sensors per pedal, in accordance with various embodiments.

With reference to FIGS. 1 and 2, aircraft 10 may include a brake system 20, which may be applied to any wheel of the landing gear. Brake system 20 may comprise a brake control system of aircraft 10. Brake system 20 of aircraft 10 may be a collection of subsystems that produce output signals for controlling the braking force and/or torque applied at each of wheels 15o, 15i, 17i, 17o. Brake system 20 may communicate with the brakes of right landing gear 14a and left landing gear 14b. Right landing gear 14a may include a right brakes 40 coupled to ROB wheel 15o and/or RIB wheel 15i. Right brakes 40 may thus be mounted to ROB wheel 15o and/or RIB wheel 15i to apply and release braking force at one or more wheel. Left landing gear 14b may include left brakes 42 coupled to LOB wheel 17o and/or LIB wheel 17i. Left brakes 42 may be mounted to LOB wheel 17o and/or LIB wheel 17i to apply and release braking force on one or more wheels.

In various embodiments, a pilot may have a left brake pedal 22 and right brake pedal 24. Left brake pedal 22 and right brake pedal 24 may each comprise one or more sensors 30 configured to detect the amount of translation at the pedals. For example, left brake pedal 22 may comprise two sensors 30 or three sensors 30 configured to detect the distance translated by left brake pedal 22. Sensor 30 may generate an electronic signal representative of the distance the pedal translates (i.e., deflects) for conversion into a desired brake force. Sensor 30 may be, for example, a linear variable differential transformer (LVDT) or a rotary variable differential transformer (RVDT). Greater translation in brake pedal corresponds to greater brake force in a manner similar to that of a car. During non-emergency operation, the signal from sensors 30 coupled to left pedal 22 are used to determine the amount of force to apply at left brakes 42. Similarly, during non-emergency operation, the signal from the sensors 30 coupled to right brake pedal 24 are used to determine the amount of force to apply at right brakes 40. The copilot may also have a left pedal 26 and right pedal 28 configured to control left brakes 42 and right brakes 40, respectively. The copilot pedals may function the same as the pilot's pedals.

Figure 3:
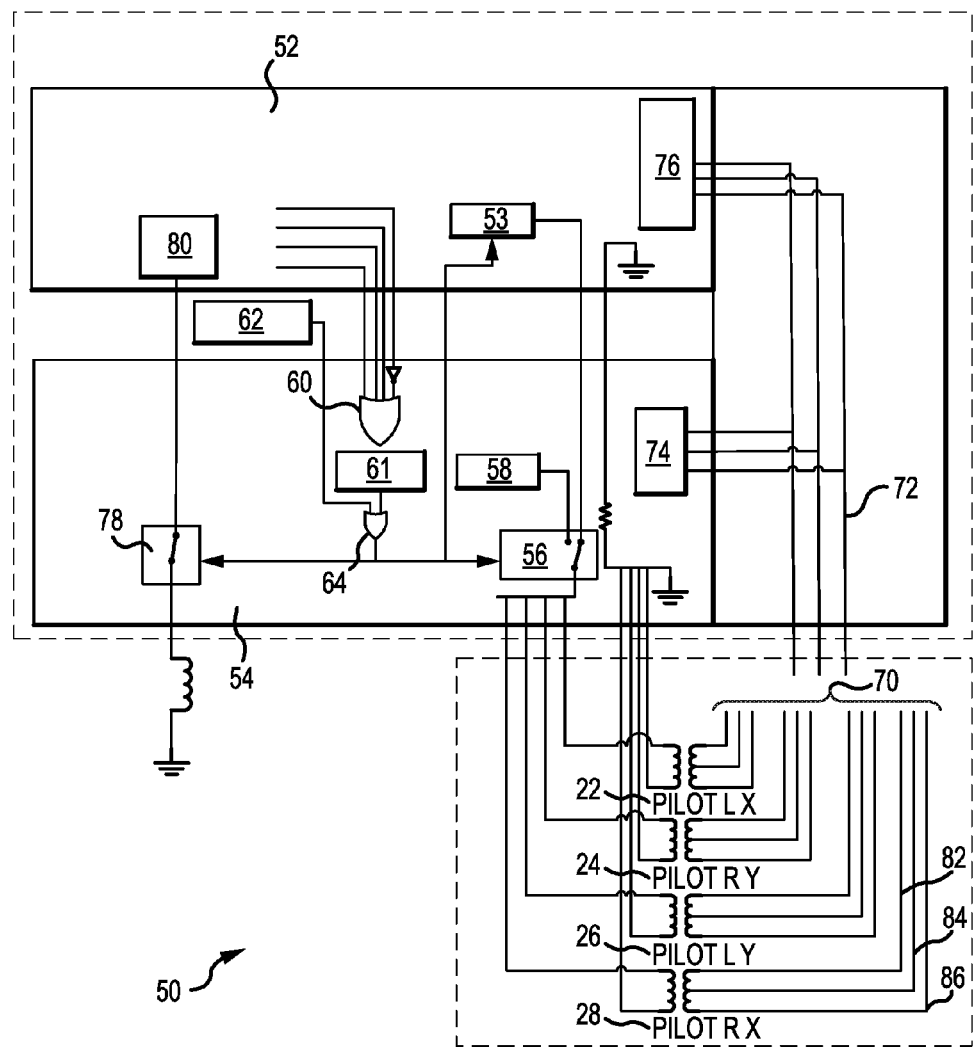
FIG. 3 illustrates a schematic diagram of an emergency brake system, in accordance with various embodiments.

With reference to FIG. 3, a brake control unit (BCU) 50 for applying emergency brake control in response to detecting a problem with non-emergency brake operation is shown, in accordance with various embodiments. BCU 50 may be a standalone computer system and/or BCU 50 may be integrated into computer systems onboard an aircraft, for example, a full authority digital engine control (FADEC), and/or an engine-indicating and crew-alerting system (EICAS). BCU 50 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, BCU 50 may comprise a processor configured to implement various logical operations in response to execution of instructions. Instructions may be stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

BCU 50 may include normal brake control logic 52 configured to control the brakes of aircraft 10 (of FIG. 1) based on signals from sensors 30 (of FIG. 2) during normal brake operation (i.e., non-emergency brake operation). BCU 50 may also include emergency brake control logic 54 configured to control the brakes of aircraft 10 based on signals from sensors 30 during emergency operation. Normal brake control logic 52 emergency brake control logic 54 may be implemented as a series of hardware devices as described herein and/or digital logic configured to emulate such hardware devices.

In various embodiments, normal brake control logic 52 may provide excitation signal 53 from a microprocessor into switch 56 as an input. In response to non-emergency operation, switch 56 may send an output signal 57 in the form of excitation signal 53 to sensors 30 of left pedal 22, right pedal 24, left pedal 26, and/or right pedal 28. Switch 56 may change the output signal 57 to analog sensor excitation signal 58 from emergency brake control logic 54 in response to BCU 50 an emergency condition being set.

In various embodiments, an emergency condition may be set by detecting one or more of a power quality anomaly, a signal timeout, a channel fault, and an excitation fault from the normal brake control logic 52 at "or" logic 60 of emergency brake control logic 54. Latch 61 may retain an emergency condition until power cycle and/or reset such that subsequent operation after the emergency condition is set may not revert to normal operation until normal brake control logic 52, emergency brake control logic 54, and/or BCU 50 are reset. An emergency condition may also be set by a pilot or flight crew manually by emergency switch 62. Emergency switch 62 may be isolated from latch 61 such that the emergency switch may be disengaged to return to brake control to normal brake control logic 52. Emergency switch 62 and the output from "or" logic 60 may pass through second "or" logic 64 so that the emergency condition may be set by either signal. The output from second "or" logic 64 may be the controlling input to switch 56 so that switch 56 may set output signal 57 to analog sensor excitation signal 58 in response to an emergency condition being set taking over from the micro-processor based excitation of normal brake control logic 52. The output from second "or" logic 64 may also deterministically cutoff the micro-processor based excitation of normal brake control logic 52 to prevent undesired interaction between excitation signal 58 and excitation signal 53.

In various embodiments, signals from sensors 30 may be processed by sensor signal processing logic 70, as described in detail below and illustrated in FIG. 4. Output signal 72 from sensor signal processing logic 70 may be directed to sensor processing 74 of emergency brake control logic 54 and/or normal brake control logic 52. Each pedal from FIG. 2 may have one or more sensor signals such as, for example, signal 82, signal 84, and signal 86 from separate sensors 30 coupled to the same pedal. Switch 78 may be switched by the output signal from second "or" logic 64 in a manner similar to switch 56. The output of switch 78 may be a shut off signal to switch brake control function of normal brake control logic 52 off in response to an emergency condition being set. Shut off driver 80 may receive the signal and shut off normal brake control logic 52 in response to an emergency condition being set.

Figure 4A:
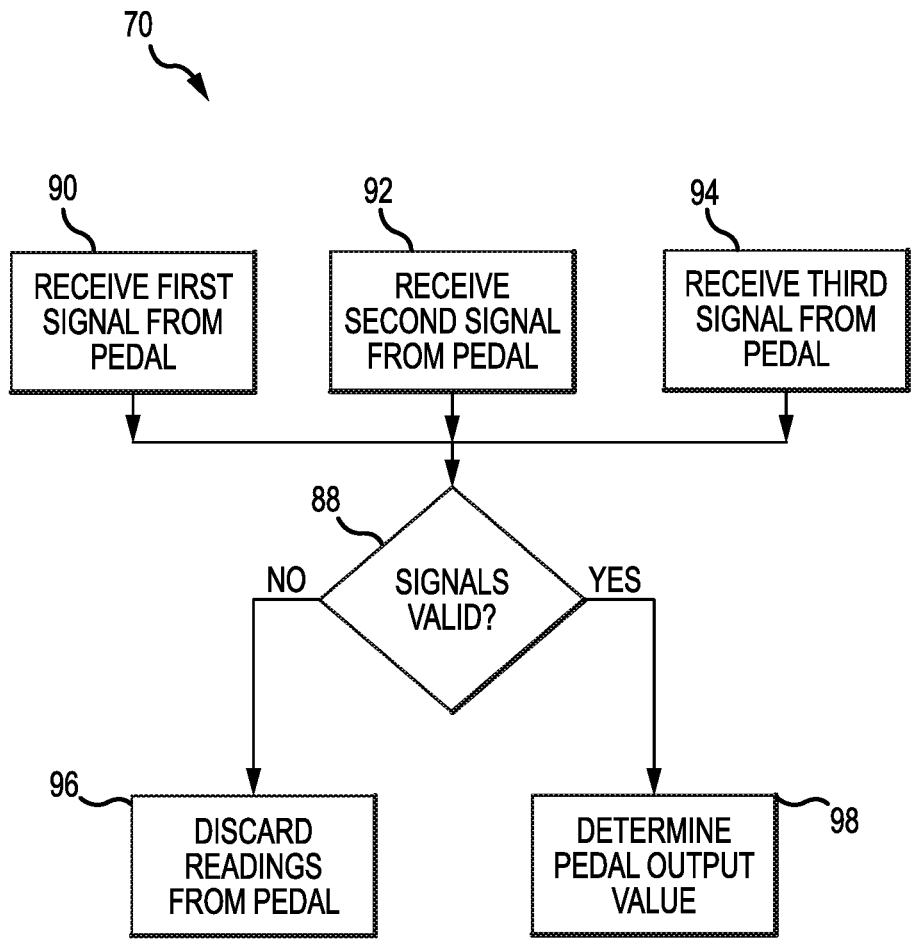
FIG. 4A illustrates signal processing logic for detecting a faulty sensor for a pedal controlled brake system, in accordance with various embodiments.
Figure 4B:
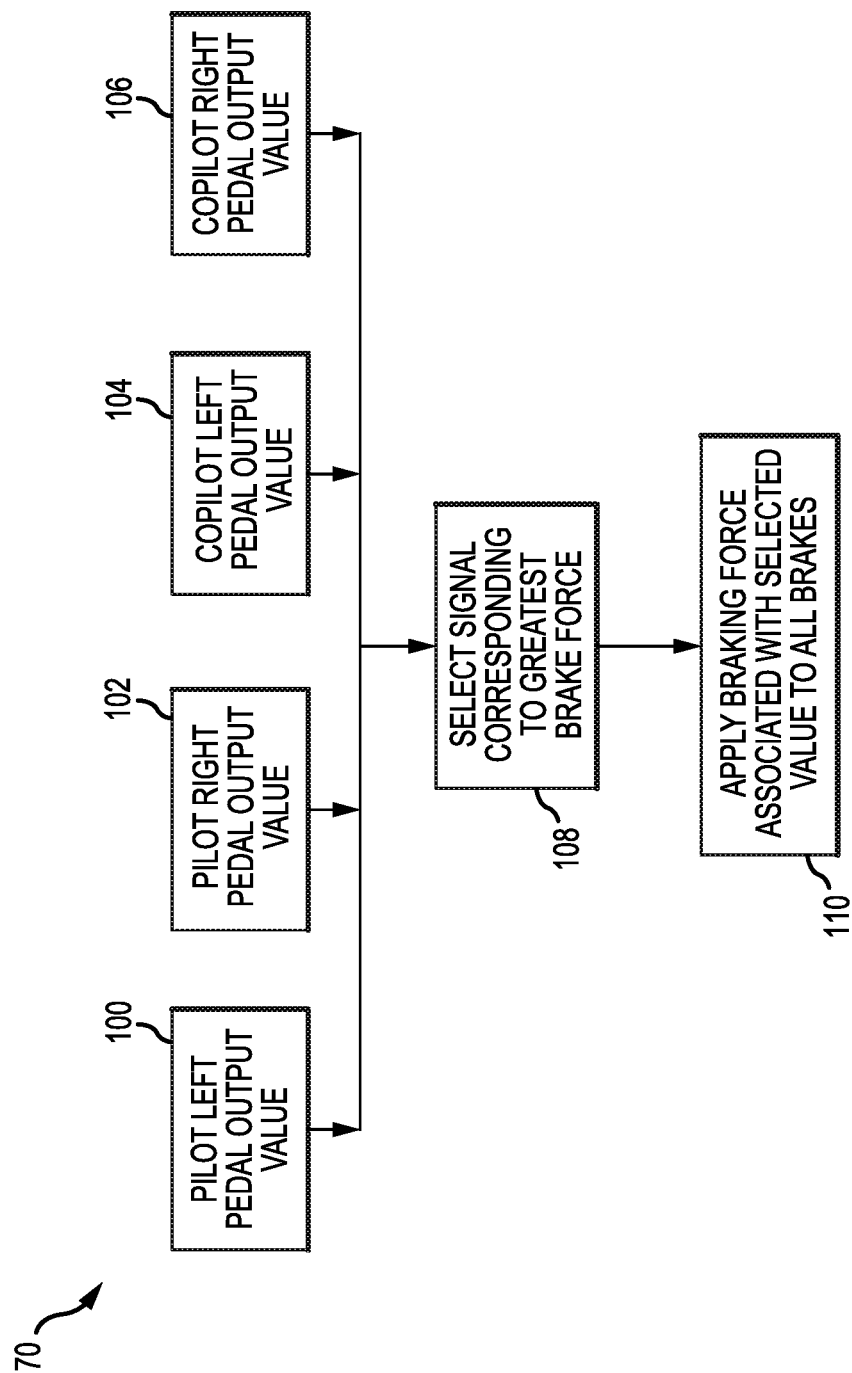
FIG. 4B illustrates signal processing logic for selecting a single signal to apply at all wheel brakes on an aircraft, in accordance with various embodiments.

Referring now to FIGS. 4A and 4B, sensor signal processing logic 70 is shown for processing pedal signals in response to an emergency condition being set as described above, in accordance with various embodiments. Sensor signal processing logic 70 may be configured to determine requested braking force for aircraft brakes in response to one or more signal 31 from one or more sensor 30 of FIG. 2 generating an erroneous signal.

The three sensors 30 may be sensors from one of the pilot pedals (left pedal 22 or right pedal 24) or copilot pedals (left pedal 26 or right pedal 28). Sensor signal processing logic 70 may compare the signals to determine whether the sensors are generating reliable signals. Sensor signal processing logic 70 may receive a first signal 82 from left pedal 22 (Step 90). The first signal may be generated by a first sensor 30. Sensor signal processing logic 70 may receive a second signal 84 from left pedal 22 generated by a second sensor 30 (Step 92). Sensor signal processing logic 70 may receive a third signal 86 from left pedal 22 generated by a third sensor 30 (Step 94).

In various embodiments, sensor signal processing logic 70 may check whether the signals are valid (Step 88). The signals may be compared to one another to determine whether the signals are within a predetermined threshold. For example the signal 82 may be compared to signal 84 to determine which is greater. Signal 84 may be compared to signal 86 to determine which is greater. Signal 86 may be compared to signal 82 to determine which is greater. Once the signals are ordered, the greatest signal may be compared to the least signal to determine the difference between the two signals. The predetermined threshold difference to detect invalid signals may be a percentage such as, for example, 5%, 10%, 15%, or any other desired percentage. A difference falling in the range of 6%0-100%, 11%-100%, or 16%-100% may thus be invalid, for example. The predetermined threshold may also be a difference value such as 0.5 millivolts, 0.5 volts, 1.0 volts, are any desired signal difference. The signal difference may also be measured in units of electrical current.

In various embodiments, in response to finding the signals invalid, sensor signal processing logic 70 may discard the information from left pedal 22 and rely on signals from other brake pedals (Step 96). In response to the signal being found valid, signal processing system may continue processing the remaining signals to determine the pedal output value (Step 98).

In various embodiments, sensor signal processing logic 70 may repeat the steps of FIG. 4A for each pedal to generate pedal output value 100 from pilot left pedal, pedal output value 102 from pilot right pedal 24, pedal output value 104 of copilot left pedal 26, and copilot right pedal 28, from step 98 in FIG. 4A. Sensor signal processing logic 70 may then select the output value corresponding to the greatest brake force (Step 108). The output corresponding to the greatest brake force may be selected by taking the value produced by the greatest amount of pedal deflection. The BCU 50 of FIG. 3 may then apply the braking force corresponding to the selected value to both right brakes 40 of FIG. 2 and left brakes 42 of FIG. 2 (Step 110). The pilot may no longer have differential braking in this instance, however, the brakes still stop the aircraft on the ground with the greatest commanded force.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake system for an aircraft, comprising:
 a left pedal assembly comprising a left pedal, a first left sensor associated with the left pedal and configured to generate a first left signal in response to translation of the left pedal, a second left sensor associated with the left pedal and configured to generate a second left signal in response to translation of the left pedal;
 a right pedal assembly comprising a right pedal, a first right sensor associated with the right pedal and configured to generate a first right signal in response to translation of the right pedal, a second right sensor associated with the right pedal and configured to generate a second right signal in response to translation of the left pedal;
 a normal brake control logic configured to control the brake system in response to a normal condition being set, wherein the normal brake control logic commands a first left force to a left brake located on a left side of the aircraft based on the first left signal and the second left signal, wherein the normal brake control logic commands a first right force to a right brake located on a right side of the aircraft based on the first right signal and the second right signal; and
 an emergency brake control logic configured to control the brake system in response to an emergency condition being set, wherein the emergency brake control logic is configured to command a same force to the left brake and the right brake based on one of the first left signal, the second left signal, the first right signal, or the second right signal.

2. The brake system of claim 1, further comprising:
 one of a third left sensor configured to generate a third left signal in response to translation of the left pedal or a third right sensor configured to generate a third right signal in response translation of the right pedal.

3. The brake system of claim 2, wherein a sensor signal processing logic determines the first right signal, the second right signal, and the third right signal are valid and generates an output signal for the right pedal.

4. The brake system of claim 3, wherein the sensor signal processing logic determines the first right signal, the second right signal, and the third right signal are valid by comparing the first right signal, the second right signal, and the third right signal to determine whether a difference between the first right signal, the second right signal, and the third right signal is within a predetermined threshold.

5. The brake system of claim 4, wherein the sensor signal processing logic generates the output signal for the left pedal by averaging the first left signal, the second left signal, and the third left signal.

6. The brake system of claim 1, wherein the normal brake control logic generates an excitation signal for the first left sensor and the first right sensor from a microprocessor.

7. The brake system of claim 6, wherein the emergency brake control logic provides an analog excitation signal to the first left sensor and the first right sensor in response to the emergency condition being set.

8. The brake system of claim 7, wherein the emergency brake control logic sends a signal to the normal brake control logic to shut off in response to the emergency condition being set.

9. The brake system of claim 1, wherein the emergency brake control logic commands a same force to the left brake and the right brake based on a greatest value from the first left signal from the left pedal, the first right signal from the right pedal, the second left signal from the left pedal, the second right signal from the right pedal, a copilot left signal from a copilot left pedal, and a copilot right signal from a copilot right pedal.

10. The brake system of claim 1, wherein the emergency brake control logic comprises a latch configured to maintain the emergency condition in response to the emergency condition being set.

11. The brake system of claim 1, further comprising a switch operable to set the emergency condition.

12. The brake system of claim 1, wherein the normal brake control logic is configured to detect the emergency condition and communicate the emergency condition to the emergency brake control logic.

13. A method of controlling a brake system in an aircraft, comprising:
setting an emergency condition in the brake system comprising a left brake and a right brake, wherein a left pedal is configured to control the left brake located on a left side of the aircraft and a right pedal is configured to control the right brake located on a right side of the aircraft under normal conditions;
receiving a first left signal from a first left sensor on the left pedal;
receiving a second left signal from a second left sensor on the left pedal;
receiving a third left signal from a third left sensor on the left pedal;
comparing the first left signal, the second left signal, and the third left signal to determine the first left signal, the second left signal, and the third left signal are valid;
generating a output value for the left pedal based on the first left signal, the second left signal, and the third left signal; and
commanding a same brake force at the left brake and the right brake based on the output value for the left pedal.

14. The method of claim 13, further comprising:
receiving a first right signal from a fourth sensor on the right pedal;
receiving a second right signal from a fifth sensor on the right pedal;
receiving a third right signal from a sixth sensor on the right pedal; and
comparing the first right signal, the second right signal, and the third right signal to determine at least one of the first right signal, the second right signal, or the third right signal is invalid.

15. The method of claim 14, further comprising determining the first right signal, the second right signal, and the third right signal are invalid in response to a difference between the first right signal and the second right signal being greater than a predetermined value.

16. The method of claim 13, further comprising selecting the output value for the left pedal in response to the output value for the left pedal being greater than the output value for a second pedal.

17. A brake control unit, comprising:
a processor;
a tangible, non-transitory memory configured to communicate with the processor, the tangible, non-transitory memory having instructions stored thereon that, in response to execution by the processor, cause the brake control unit to perform operations comprising:
setting, by the brake control unit, an emergency condition to switch control of an aircraft brake from a normal brake control logic to an emergency brake control logic;
comparing, by the emergency brake control logic, a first signal from a first sensor in operable communication with a first pedal, a second signal from a second sensor in operable communication with a second pedal, and a third signal from a third sensor in operable communication with a third pedal;
selecting, by the emergency brake control logic, a selected value from the first signal, the second signal, and the third signal, wherein the selected value is selected by taking a greatest value from the first signal, the second signal, and the third signal; and
commanding a same brake force at a left brake located on a left side of the aircraft and a right brake located on a right side of the aircraft based on the selected value.

18. The brake control unit of claim 17, further comprising:
receiving a fourth signal from a fourth sensor on a fourth pedal;
receiving a fifth signal from a fifth sensor on the fourth pedal;
receiving a sixth signal from a sixth sensor on the fourth pedal; and
comparing the fourth signal, the fifth signal, and the sixth signal to determine at least one of the fourth signal, the fifth signal, or the sixth signal is invalid.

19. The brake control unit of claim 18, further comprising determining the fourth signal, the fifth signal, and the sixth signal are invalid in response to a difference between at least two of the fourth signal, the fifth signal, and the sixth signal being greater than a predetermined value.

* * * * *